United States Patent [19]
Langan

[11] 3,725,804
[45] Apr. 3, 1973

[54] CAPACITANCE COMPENSATION CIRCUIT FOR DIFFERENTIAL AMPLIFIER

[75] Inventor: Marion J. Langan, Huntsville, Ala.

[73] Assignee: Avco Corporation, Huntsville, Ala.

[22] Filed: Nov. 26, 1971

[21] Appl. No.: 202,442

[52] U.S. Cl. ......................330/69, 330/149, 330/151
[51] Int. Cl. ..................................................H03f 3/68
[58] Field of Search ...............330/30 D, 69, 149, 151

[56] References Cited

UNITED STATES PATENTS

| | | | |
|---|---|---|---|
| 3,316,495 | 4/1967 | Sherer | 330/69 UX |
| 3,531,733 | 9/1970 | Haines | 330/30 D |

OTHER PUBLICATIONS

"Applications Manual For Operational Amplifiers," Philbrick/Nexus Research, 1968, P. 81

*Primary Examiner*—Roy Lake
*Assistant Examiner*—James B. Mullins
*Attorney*—Charles Marshall Hogan

[57] ABSTRACT

A differential amplifier is often used as a signal conditioner for low level transducer pick-ups. In many such applications the differential amplifier is remotely located with respect to the transducer. If there is amplifier input capacitance, or capacitance from either transmission line to any potential other than that of a driven guard, differential error signals may be derived from common mode potentials. There is here disclosed circuit means for compensating for amplifier input capacitance and/or transmission line capacitance to unguarded potentials by use of regenerative feedback of the amplified common mode signal to each input of the differential amplifier.

1 Claim, 6 Drawing Figures

INVENTOR.
MARION J. LANGAN
BY Charles M. Hogan

ATTORNEY.

INVENTOR.
MARION J. LANGAN
BY Charles M. Hogan
ATTORNEY.

INVENTOR.
MARION J. LANGAN
BY Charles M. Hogan
ATTORNEY.

CAPACITANCE COMPENSATION CIRCUIT FOR DIFFERENTIAL AMPLIFIER

BACKGROUND OF THE INVENTION

In the use of differential instrumentation amplifiers a commonly desired figure of merit is a 120 decibels rejection of 60 cycle common mode signals, in the presence of a source impedance unbalance of 1,000 ohms. The achievement of such merit involves a limitation of leakage capacitance of not to exceed approximately 6 picofarads between either input line and ground or any undriven (i.e. fixed) potential point. This limitation is sought to be accomplished by guarding the two input lines with a shield that is driven at the common mode potential. Guarding is subject to several limitations. It can be impaired by connectors, or by provisions made for terminating the lines, or by absence for at least several inches before termination. Prior art practices require that the differential amplifier be boot-strapped in order to minimize input capacitance. In the multiplexing case the entire multiplexer is driven at guard potential, thereby subjecting the multiplexing elements to higher breakdown potentials and requiring the use of isolated power supplies.

The principal object of the present invention is to provide an amplifier circuit so arranged that the effects of input capacitance are compensated for, thereby preventing compromise of common mode rejection.

Another object of the invention is to eliminate the necessity to drive multiplexing elements at guard potential. The invention has a wide range of application.

For further prior-art background reference is made to the following portions of Elliot L. Gruenberg edition, *Handbook of Telemetry and Remote Control* (New York: McGraw-Hill 1967): pages 4–35 through 4–38 inclusive, under the heading "Signal Conditioning;" pages 8–8 through 8–10, particularly the description of FIGS. 4 and 5; and pages 8–14 and 8–15, under the heading "Multiplex Configuration."

For a better understanding of the invention, together with an appreciation of other and further advantages and capabilities thereof, reference is made to the following description of the accompanying drawings.

DESCRIPTION OF THE DRAWINGS

In the drawings,

FIG. 3 is a circuit schematic of the combination in accordance with the invention, in which the effect of inherent input capacitance is compensated for;

DETAILED DESCRIPTION OF THE INVENTION

The description of the invention is prefaced by a brief discussion of the prior art.

Figure 1:
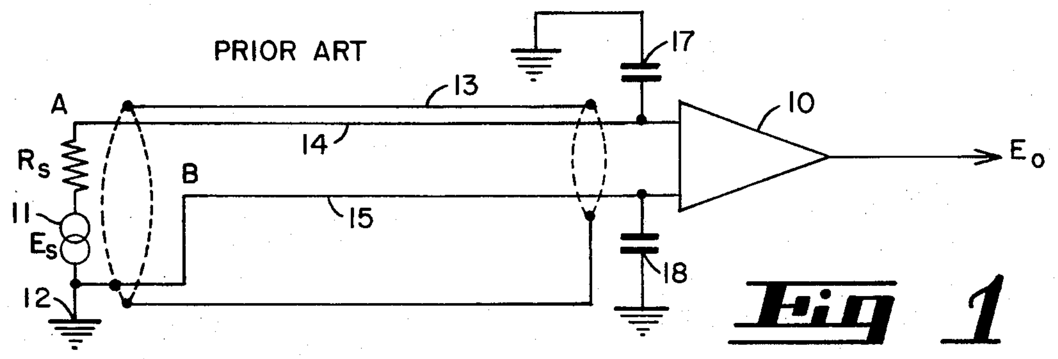
FIG. 1 is used for purposes of explanation and is a schematic of a prior art remotely driven instrumentation amplifier with shielding.

FIG. 1 illustrates a prior art application of an instrumentation amplifier 10 that is driven by a remotely located signal source 11. One side of the remotely located signal source 11 is grounded at 12 in the remote location, and an electrostatic shield 13, or guard, which surrounds the two signal lines 14 and 15 is likewise grounded at the signal source. For purposes of this illustration, the signal source is considered to have a source impedance $R_s$ of 1,000 ohms. Capacitances 17 and 18 represent the combination of the input capacitance of the amplifier and the stray capacitance of the signal lines to the amplifier local ground or to any static potential other than that of the guard.

Since the signal source is remotely located with respect to the amplifier, the remotely located ground frequently has an alternating component of voltage with respect to the local ground of the amplifier. This alternating current component of voltage is usually at a frequency of 60 cycles or some harmonic thereof, but may be at some other frequency depending upon the particular electrical environment. The effect of this alternating current voltage on remote ground is to create this potential on both input lines and the guard. This voltage is normally referred to as the "common mode voltage." Since the impedance of the signal source is 1,000 ohms, and the signal source 11 is essentially in series with input line 14, the common mode voltage appearing on line A has a 1,000 ohm higher source impedance than the common mode voltage appearing on line 15.

If each of capacitances 17 and 18 is 6 picofarads, the approximate reactance of each at 60 cycles is 500 megohms. Capacitance 18 has negligible effect on the amplitude of the signal on line 15 due to the low source impedance, but capacitance 17 attenuates the signal on line 14 because of the 1,000 ohm source impedance, thus deriving a small differential, or normal mode, signal from the common mode input.

The above example of the manner in which a common mode signal may be generated is illustrative and not limiting. As a general rule, a common mode signal from an unbalanced source impedance causes a spurious normal mode signal at the input to a differential amplifier if any unguarded capacitance is present.

Figure 2:
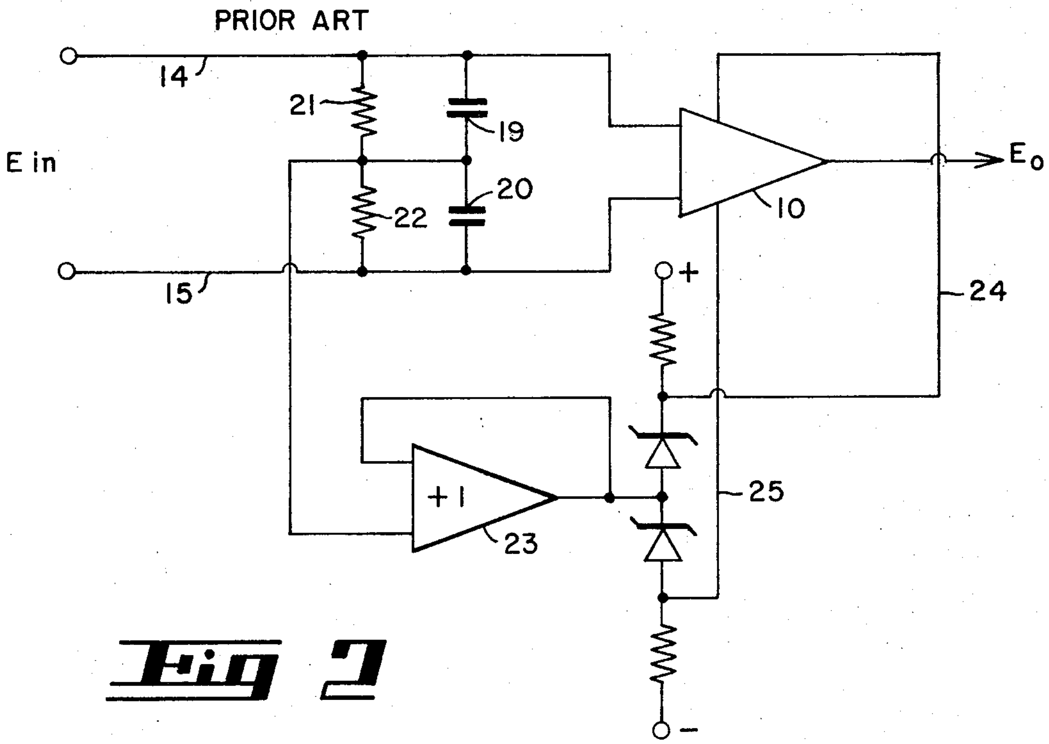
FIG. 2 is a schematic, again used for purposes of explanation, showing a prior art method of "bootstrapping" an amplifier input in order to minimize the effects of input circuit capacitance.

A conventional method of "bootstrapping" an amplifier input to minimize circuit input capacitance and also to tolerate a large common mode voltage without overdriving the amplifier is illustrated in FIG. 2. A common mode potential is derived from the midpoint of the two lines 14 and 15 by network 19, 20, 21 and 22 and converted to low impedance by amplifier 23 to serve as a reference for the positive and negative supply voltages for the differential amplifier 10. The positive voltage supply line is 24. The negative one is 25. As a result of this technique, the amplifier essentially floats up and down at the common mode potential. This technique does nothing, however, to eliminate the capacitance from either input line to ground.

Figure 3:
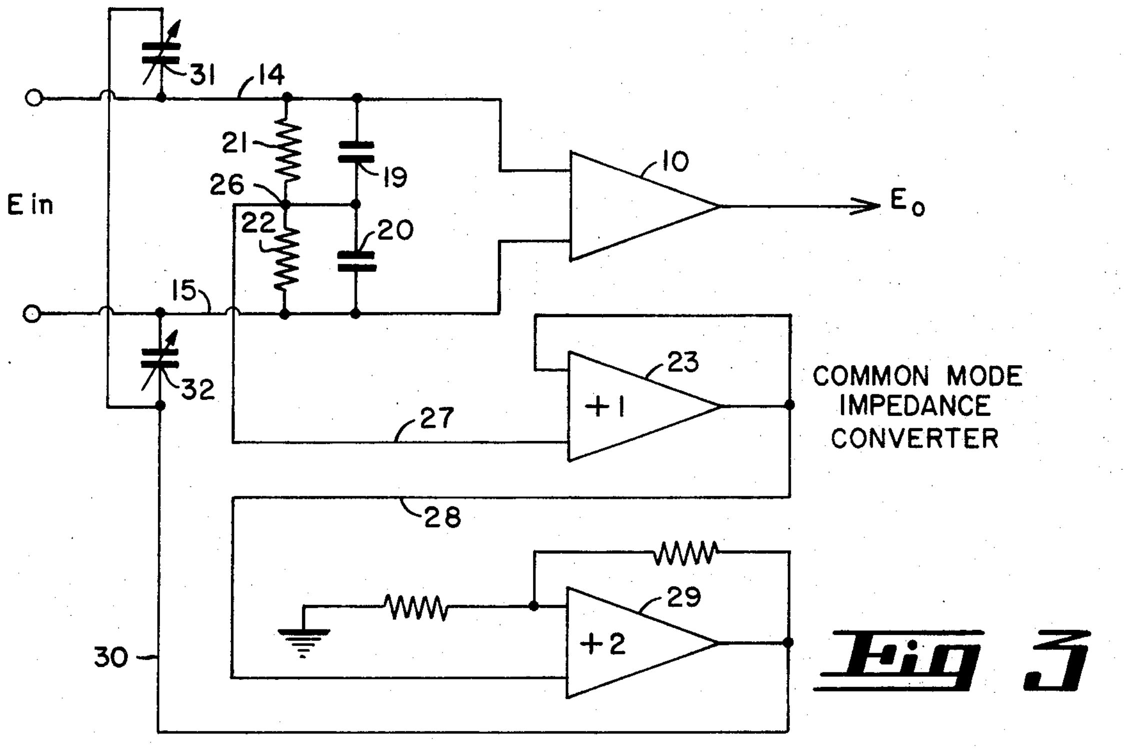

Now making reference to FIG. 3, there is shown a preferred embodiment of the invention as utilized with a differential amplifier 10 having input lines 14 and 15, each of which has stray capacitance to ground, for example, as respectively indicated at 17 and 18 in FIG. 1. The common mode potential is derived from the center tap 26, which center tap constitutes the junction of resistors 21 and 22 and the junction of capacitors 19 and 20. The resistors 21 and 22 are connected serially across the input lines 14 and 15. The capacitors 19 and 20 are also connected serially across those lines.

The common mode potential is converted to low impedance, in the usual fashion, via a common mode impedance converter, in the form of an amplifier 23 having an input 27 connected to tap 26 and an output 28. Amplifier 23 is non-inverting. The common mode signal at low impedance is applied via line 28 to an amplifier 29, which amplifier has an output 30 supplying regenerative voltages to tuneable capacitors 31 and 32, respectively connected to input lines 14 and 15. Amplifier 29 is a non-inverting amplifier with a gain of two, for example.

As previously indicated, the amplifier common mode signal is fed through the capacitances 31 and 32, in regenerative fashion, to each input line of the amplifier. The capacitors 31 and 32 are then tuned in order to be equated to their respective unguarded capacitances (17 and 18, FIG. 1) on the input lines. The amplified common mode signals cancel the undesired effects of the inherent and stray input capacitance. This is explained by reference to FIG. 4.

Figure 4:
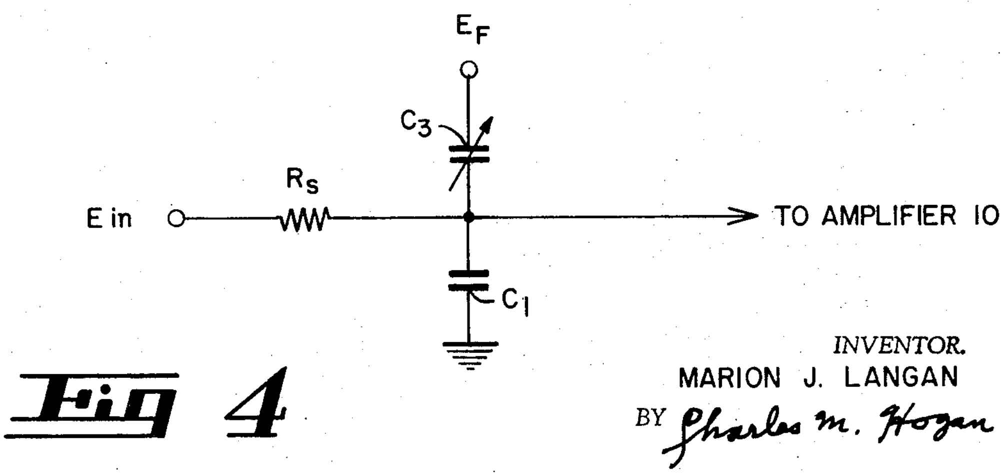
FIG. 4 is a fragmentary schematic used as an aid in explaining the operation of the preferred FIG. 3 embodiment of the invention.

In FIG. 4 $C_3$ symbolically represents the capacitor 31 and $C_1$ corresponds to the unguarded capacitance 17 in FIG. 1.

Consider now the effect of $C_3$ and the feedback signal Ein × 2. A 1 volt change at the junction of $C_1$ and $C_3$ is accompanied by a 2 volt feedback signal of the same polarity. Under this condition, the change in voltage across $C_1$ is equal to the change in voltage across $C_3$. The current required to charge $C_1$ is now provided by $C_3$, thus eliminating the loading effect of $C_1$ on Ein. It may be observed that the same results may be achieved by using some value of $C_3$ that is greater than or less than $C_1$ so long as the magnitude of the feedback signal is adjusted to provide the same charging current for $C_1$. Expressed mathematically, $\mathrm{Ein}C_1 = (E_F - \mathrm{Ein}) C_3$ will produce the desired result so long as $E_F$ is greater than Ein.

Thus far, we have considered Ein to be a common mode signal. Let us now consider normal mode of operation. A common mode signal is considered to be the average of the voltage on the two input lines, that is $E_{HI} + E_{LO}/2$. By this definition, a normal mode signal would produce a common mode signal of $E_{NM}/2$. In the above equation, where $\mathrm{Ein}\ C_1 = (E_F - \mathrm{Ein})\ C_3$, $E_F$ was derived from the common mode signal. Now, since the common mode signal is equal to $E_{NM}/2$, the right hand expression becomes $((E_F/2) - \mathrm{Ein})\ C_3$. Obviously, if $E_F$ equals Ein × 2 and $C_3 = C_1$, then $((E_F/2) - \mathrm{Ein}) = 0$, and $C_3$ and the feedback signal have no effect on the normal mode signal. $C_3$ could be removed with no change in normal mode performance. If, however, the feedback signal is made very large and $C_3$ very small while still satisfying the common mode equation $\mathrm{Ein}\ C_1 = (E_F - \mathrm{Ein})\ C_3$, the effect of the circuit on normal mode operation is to approach a 50 percent compensation for the loading effect of $C_1$. Example:

$E_F = \mathrm{Ein} \times 101$ and $C_3 = 0.01$, for common mode operation $(E_F - \mathrm{Ein})\ C_3 = (101\text{-}1)\ 0.01 = 1$. For normal mode $((E_F/2) - \mathrm{Ein})$ times $C_3 = (50.5\text{-}1)\ 0.01 = 0.495$. From this analysis, a high gain feedback in conjunction with a small $C_3$ appears attractive. On a practical basis, however, the gain in the feedback is limited by the magnitude of the common mode signal and the size of the available power supplies. A common mode signal of ± 10 volts requires a ± 20 volt swing on the basis of $E_F = \mathrm{Ein} \times 2$; a ± 20 volt swing is readily obtained from a ± 25 volt supply, a frequently used source voltage for instrumentation amplifiers.

In most cases input capacitance to ground has a negligible effect on normal mode signal accuracy. For example, the same value of capacitance that converts a common mode signal of 60 cycles at 10 volts to a normal mode signal of 10 microvolts (120 decibels, common mode rejection) would attenuate a normal mode signal of 60 cycles by only 0.0001 percent. Common mode errors due to input capacitance become of consequence as the input frequency or source impedance increases.

Figure 5:
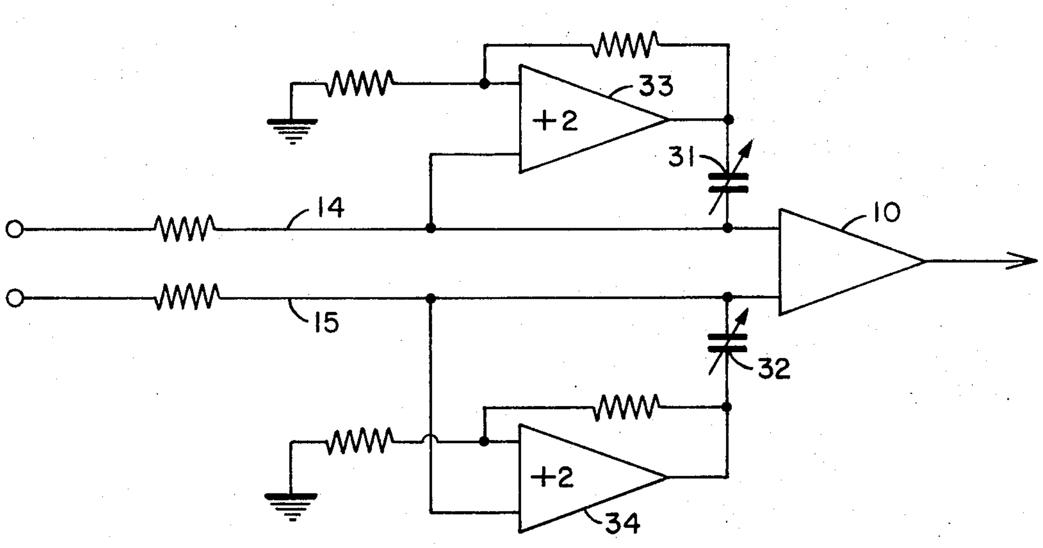
FIG. 5 is a circuit schematic of an alternate embodiment of the invention.

An alternate form of compensating circuit in accordance with the invention is illustrated in FIG. 5. The signal on line 14 is converted to low impedance in an amplifier 33 having an input connected to line 14 and an output so arranged that a signal is applied via tuneable capacitor 31 to one of the inputs of amplifier 10. An amplifier 34, likewise having a gain of two, is similarly related to input 15 and tuneable capacitor 32. The capacitors 31 and 32 are tuned so as to compensate for the unguarded capacitances 17 and 18 respectively (see FIG. 1). In the FIG. 5 embodiment a signal is derived from each input line, amplified, and then regeneratively fed back to the same input line. With this approach, all of the benefits of the previously described technique are achieved for both common mode and normal mode signals, but at the expense of providing two feedback amplifiers rather than one.

The invention enables one to dispense with guard driving of multiplexers. This is a significant advantage as will appear from the following discussion.

Figure 6:
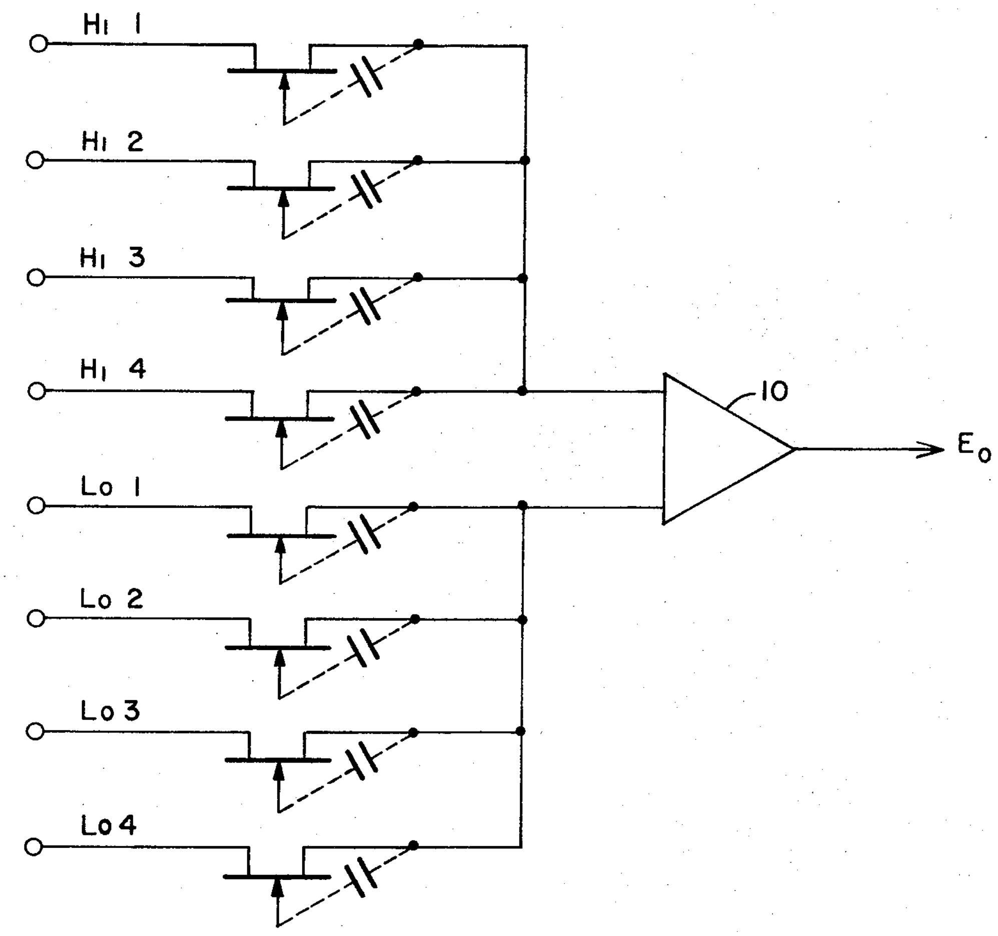
FIG. 6 is a fragmentary schematic of a multiplexed amplifier and is used to describe certain advantages of the invention.

Inputs to an instrumentation amplifier are often multiplexed. If relays are employed, the capacitance from contacts to coil of each relay appears as amplifier input capacitance. In like manner, if solid state switches such as field effect transistors are used, the capacitance from the multiplexer output to the gate of each switch in the OFF state appears as amplifier input capacitance as illustrated in FIG. 6. In order to maintain satisfactory common mode rejection with multiplexed inputs, it is a common practice to drive the gates of all of the field effect transistors in synchronism with the common mode signal and with the same signal magnitude. Since the gates are driven in phase with the common mode signal, the effect is to neutralize switch output to gate capacitances.

Driving of a multiplexer in the above described manner is cumbersome. The usual approach is to provide complete isolation for the power supplies required for the multiplexer and then drive the power supply reference at the guard potential. In addition to being cumbersome and expensive, driving a multiplexer in this manner subjects the switching elements to substantially higher breakdown voltages than those which occur if the multiplexer is not driven at the guard potential. This occurs when the common mode voltage of the multiplexed signals are not in phase. Many multiplexers now on the market stipulate common mode voltage tolerance of ± 10 volts for the input signals. Examination of the product reveals that there will be source-to-gate breakdown or source-to-drain feedthrough of OFF channels if the common mode voltages are not in phase.

To elaborate on the above, if a ± 10 volt signal is to be tolerated (this is frequently specified to be the maximum combination of common mode and normal mode signal) and an N channel field effect transistor switch with negative 10 volts cut-off voltage is employed as a switching element, the maximum permissible positive excursion of the gate voltage on OFF channels is −20 volts in order to avoid source-to-drain feedthrough from −10 volts signals. Now, since the gates of the OFF channels are driven in synchronism with the common mode voltage of the ON channel, which may be ± 10 volts, the OFF channel gates are driven from −20 to −40 volts. An OFF channel source voltage that is 180° out of phase with the sampled channel will be +10 volts at the time its gate voltage is −40 volts, thus subjecting the field effect transistor to 50 volts source-to-gate breakdown voltage. Field effect transistors with less than 10 volts cutoff voltage will be subjected to correspondingly less gate breakdown voltage. To summarize, a guard driven multiplexer that accommodates ± 10 volt common mode inputs subjects the switching field effect transistors to a source-to-gate breakdown voltage of 40 volts + pinch-off voltage if the common mode voltages are not in phase. By contrast, a multiplexer that is not driven by the guard subjects the field effect transistors to 20 volts + pinch-off voltage to achieve the same results, thus providing a latitude for using the same field effect transistor with a 20 volt greater margin of safety against breakdown, or using a cheaper 20 volt lower breakdown voltage field effect transistor with the same safety margin as that of the driven multiplexer.

In summary, this invention provides a new and economical technique for compensating for amplifier input capacitance from either input to ground or other fixed potentials wherein the common mode signal is amplified and fed back to each input line through capacitances which are tuneable to satisfy the equation $E_{cM} \times C_{input} = (E_F - E_{cM})$ C Feedback, and an alternate technique for compensating for amplifier input capacitance from either input to ground or other fixed potentials wherein the signal on each input line is amplified by a separate amplifier and fed back to the same input line through a capacitance which is tuneable to satisfy the equation $E_{in} \times C_{input} = (E_F - E_{in})$ C Feedback.

The invention further provides (1) either of the techniques described above in a solid state multiplexer system wherein the previously referred to tuneable capacitances may be adjusted to compensate for the previously referred to input capacitances in combination with the additional capacitances associated with the solid state multiplexer, and (2) either of the techniques described above in a relay type or crossbar multiplexer wherein the previously referred to tuneable capacitances may be adjusted to compensate for the previously referred to input capacitances in combination with the capacitances associated with the relay type or crossbar multiplexer.

In a demonstration of the techniques herein disclosed, a common mode rejection ratio of 130 decibels at 60 cycles was achieved with a 1,000 ohm source unbalance in either input and capacitances to ground in excess of 100 picofarads.

While there have been shown and described what is at present believed to be the preferred and the alternate embodiments of the invention, it will be understood by those skilled in the art that various changes and modifications may be made therein without departing from the scope of the invention as defined in the appended claims.

Having described my invention, I claim:

1. In combination:

a differential amplifier which comprises at least a pair of input lines and an output and which normally suffers from performance impairment due to leakage capacitances between the input lines and a point of fixed potential, means for deriving a common mode signal from said lines, and amplifying means having a gain and including a pair of adjustable capacitors individually connected to said input lines for regeneratively capacitively feeding amplified forms of said common mode signal back to said input lines so as to compensate for the undesired effect of said leakage capacitances, the gain and the capacitors being so proportioned that:

$E_{in} \times C_{input} = (E_F - E_{in})$ *C* Feedback where $E_{in}$ is the input potential on an input line, $C_{input}$ is the leakage capacitance of that input line, $E_F$ is the feedback signal applied to said input line, and *C* Feedback is the capacitance of the associated feedback capacitor, compensation for the loading effect of the capacitors on the normal mode signal being increased as these values are decreased and as the feedback voltage is increased.

* * * * *